J. A. WALSBURGER.
CHILD'S VEHICLE.
APPLICATION FILED OCT. 12, 1921.
1,421,046.
Patented June 27, 1922.
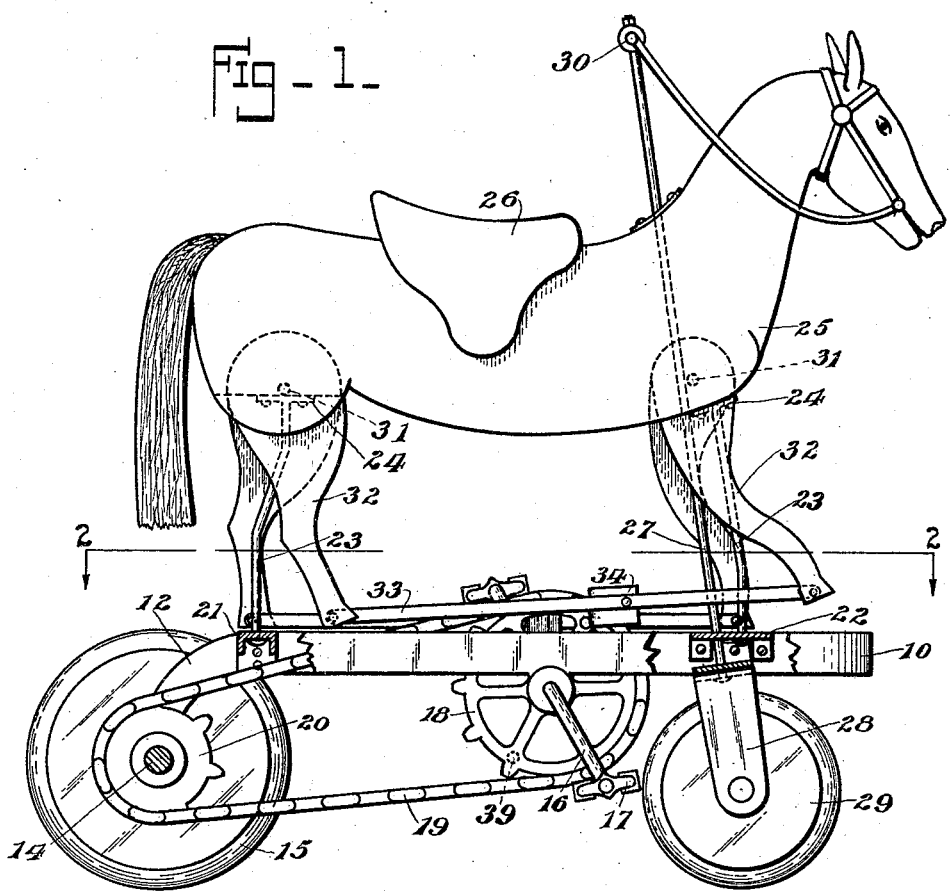
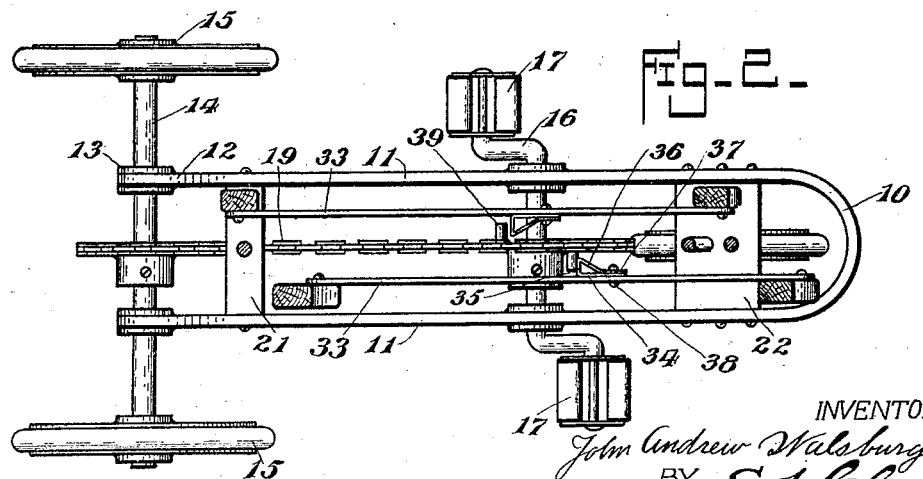
INVENTOR
John Andrew Walsburger
BY E. J. Clarkson
ATTORNEY

UNITED STATES PATENT OFFICE.

JOHN ANDREW WALSBURGER, OF LOUISVILLE, KENTUCKY.

CHILD'S VEHICLE.

1,421,046.   Specification of Letters Patent.   Patented June 27, 1922.

Application filed October 12, 1921. Serial No. 507,164.

*To all whom it may concern:*

Be it known that JOHN ANDREW WALSBURGER, a citizen of the United States of America, residing at Louisville, in the county of Jefferson and State of Kentucky, has invented certain new and useful Improvements in Children's Vehicles, of which the following is a specification.

This invention relates to toy vehicles and has special reference to a tricycle.

One important object of the invention is to provide an improved general construction of a tricycle for children having an amusement device in the form of a horse arranged in such manner that its legs may move in imitation of the legs of a pacing horse.

Another important object of the invention is to provide a novel arrangement of actuating means for the legs of the animal.

With the above and other objects in view, the invention consists in general of certain novel details of construction and combinations of parts hereinafter fully described, illustrated in the accompanying drawings, and specifically claimed.

In the accompanying drawings. like characters of reference indicate like parts in the several views, and:—

Figure 1 is a side elevation of the improved tricycle, partly in section.

Figure 2 is a section on the line 2—2 of Figure 1.

In the embodiment of the invention herein illustrated there is provided a main frame consisting of a strip of bar metal bent intermediate its ends to an elongated U-shape having an arcuate central portion 10 and legs 11 which are bent down at the back as at 12 and carry on their extremities bearings 13 wherethrough passes a rear axle 14 on which are mounted fixedly the wheels 15. Journalled beneath the central portion of the legs 11 is a crank shaft 16 which is provided on its crank ends with pedals 17. On this crank shaft is a sprocket wheel 18 which is connected by a chain 19 with a sprocket wheel 20 fixed on the shaft 14. Extending transversely of the rear portions of the legs 11 is a channel bar 21 while across the front portions of these legs extend a plate 22. Carried by the channel bar are standards 23 which are provided at their upper ends with heads 24 secured beneath the body of a seat support 25 which is preferably in the form of a horse and which is provided with a saddle 26 forming the seat. Extending downwardly through the forward part of this body is a steering post 27 which carries on its lower end a fork 28 between the arms of which is journalled the forward wheel 29. On the upper end of the post is a cross bar 30 forming the steering handle.

Pivotally connected at 31 to the body 25 are the legs 32 and on each side the front and rear legs are connected by a link 33 so that these front and rear legs will move, on each side of the horse, in unison. On each of the links 33 is mounted a lug which consists of a single strip of metal having a portion 34 lying flat against the respective link 33, a second portion 35 extending outward at right angles from the rear end of the portion 34, a third portion 36 extending from the end of the portion 35 diagonally toward the portion 34, and a fourth portion 37 bent to extend along the front part of the portion 34. A rivet 38 passes through the respective link 33, the portion 37 and the forward end of the portion 34 and serves to secure the respective lug on its link. Projecting from the sprocket wheel 18 are pins 39 which are positioned at diametrically opposite points on the sprocket and which project from opposite sides thereof so as to engage the respective lugs, striking against their faces 35 alternately.

In operation the vehicle is driven in the usual manner by the feet of the operator on the pedal 17. This causes rotation of the sprocket 18 so that the pins 39 are brought alternately into contact with the rear portions 35 of the lugs. As these pins contact in this manner the links 33 are forced forwardly and thus move the legs 32 forwardly and, due to the manner in which they are pivoted, the forward movement raises the center of gravity of the links and legs so that after the pin has passed the lug the legs will then swing back. It will be obvious that the more inwardly the vehicle is ridden the greater will be the movement of the legs forward due to the striking of the pins against the lugs and thus the faster the vehicle moves the greater apparent stride will be given to the horse.

Furthermore by reason of the peculiar location of the lugs intermediate the ends of the links 33 and the engagement of the pins 39 with these lugs the operation is unaccompanied by the danger of breaking one of the horse's legs as is the case where pins are employed which engage directly with the latter.

There has thus been provided a simple and efficient device of the kind described and for the purposes specified.

It is obvious that minor changes may be made in the form and construction of the invention without departing from the material principles thereof. It is not therefore desired to confine the invention to the exact form herein shown and described, but it is wished to include all such as properly come within the scope claimed.

Having thus described the invention, what is claimed as new, is:—

1. In a vehicle of the class described, a frame consisting of a single strip of metal bent to substantial U-shape and having its arcuate end disposed forwardly, an axle journalled in the rear ends of said frame, wheels on said axle, cross members connecting the sides of the frame, standards projecting upwardly from said cross members, a seat simulating an animal's body mounted on said standards, a crank shaft journalled to said frame intermediate its ends, legs for the animal pivoted to the body, links each connecting the front and rear leg on one side of the animal, a sprocket wheel mounted on said crank shaft, a second sprocket wheel mounted on the axle, a chain connecting said sprockets, lugs fixed to said links intermediate their ends, and pins projecting from the first mentioned sprocket and engaging said lugs.

2. In a vehicle of the class described having a seat simulating an animal provided with movable legs and having a driving sprocket, links connecting the lower ends of said legs, one of said links connecting the front and rear legs on one side and the other connecting the front and rear legs on the other side, lugs fixed to said links and each consisting of a single strip of metal having a portion lying against the inner side of a respective link, a portion at right angles to the first portion and at the rear end thereof, a portion extending diagonally forward from the inner end of the right angle portion and bent to lie flat against the forward end of the first mentioned portion, and pins projecting from opposite sides of the sprocket to alternately engage said lugs.

In testimony whereof I affix my signature.

JOHN ANDREW WALSBURGER.